(12) United States Patent
Chokhawala et al.

(10) Patent No.: US 10,929,870 B1
(45) Date of Patent: Feb. 23, 2021

(54) ADVERTISEMENT IMPRESSION VERIFICATION USING BLOCKCHAIN

(71) Applicant: Reflektion, Inc., San Mateo, CA (US)

(72) Inventors: Amar Chokhawala, San Mateo, CA (US); Vivek Gupta, San Jose, CA (US)

(73) Assignee: REFLEKTION, INC., San Mateo, CA (US)

( * ) Notice: Subject to any disclaimer, the term of this patent is extended or adjusted under 35 U.S.C. 154(b) by 296 days.

(21) Appl. No.: 16/002,942

(22) Filed: Jun. 7, 2018

(51) Int. Cl.
*G06Q 30/02* (2012.01)

(52) U.S. Cl.
CPC ..... *G06Q 30/0242* (2013.01); *G06Q 30/0248* (2013.01); *G06Q 30/0277* (2013.01)

(58) Field of Classification Search
CPC ........... G06Q 30/0242; G06Q 30/0277; G06Q 30/0248
See application file for complete search history.

(56) References Cited

U.S. PATENT DOCUMENTS

| | | | | |
|---|---|---|---|---|
| 8,732,015 B1 * | 5/2014 | Beckerman | ........ | G06Q 30/0242 705/14.46 |
| 2010/0162206 A1 * | 6/2010 | Roth | ........................ | G01J 5/10 717/106 |
| 2012/0029983 A1 * | 2/2012 | Rodriguez | ............. | G06Q 30/02 705/14.4 |
| 2019/0050810 A1 * | 2/2019 | Nagalla | ............... | G06Q 10/0838 |
| 2019/0370866 A1 * | 12/2019 | Lawbaugh | ............ | H04L 9/0637 |
| 2020/0104913 A1 * | 4/2020 | Lawrenson | ............ | G06N 20/00 |

OTHER PUBLICATIONS

Ullah et al. Privacy-preserving targeted mobile advertising: A blockchain-based framework for mobile ads. arXiv:2008.10479. (Year: 2020).*

* cited by examiner

*Primary Examiner* — William A Brandenburg
*Assistant Examiner* — Christopher C Busch
(74) *Attorney, Agent, or Firm* — David R. Stevens; Stevens Law Group

(57) ABSTRACT

Advertising impressions are collected and a block in a block chain is created for each impression or a set of impressions. Each block includes a hash of a preceding block in the block chain. The block chain may be traversed to analyze advertising impressions and determine their effectiveness. Advertising content may include embedded code that invokes transmission of a notification to a server. The server creates a block in response to the notification that includes data such as the advertising content (or a reference to it), attributes of a target consumer, information regarding an advertising campaign, and/or other data describing the advertising impression.

17 Claims, 5 Drawing Sheets

ADVERTISEMENT IMPRESSION VERIFICATION USING BLOCKCHAIN

BACKGROUND

Nearly every communication medium has become a forum for advertisers to reach consumers. In the case of television, a ratings system is used to determine the audience reached by an advertisement. This enables the advertiser to readily determine the value of purchasing advertising time. In the case of online advertisements, tracking is readily performed but often relies on the integrity of a third party to accurately report a number of advertisement impressions. In some cases, the third party has a financial incentive to inflate the number of advertisement impressions, resulting in uncertainty as to the reach of an online advertisement.

The system and methods disclosed herein provide an improved approach for verifying online advertisement impressions.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
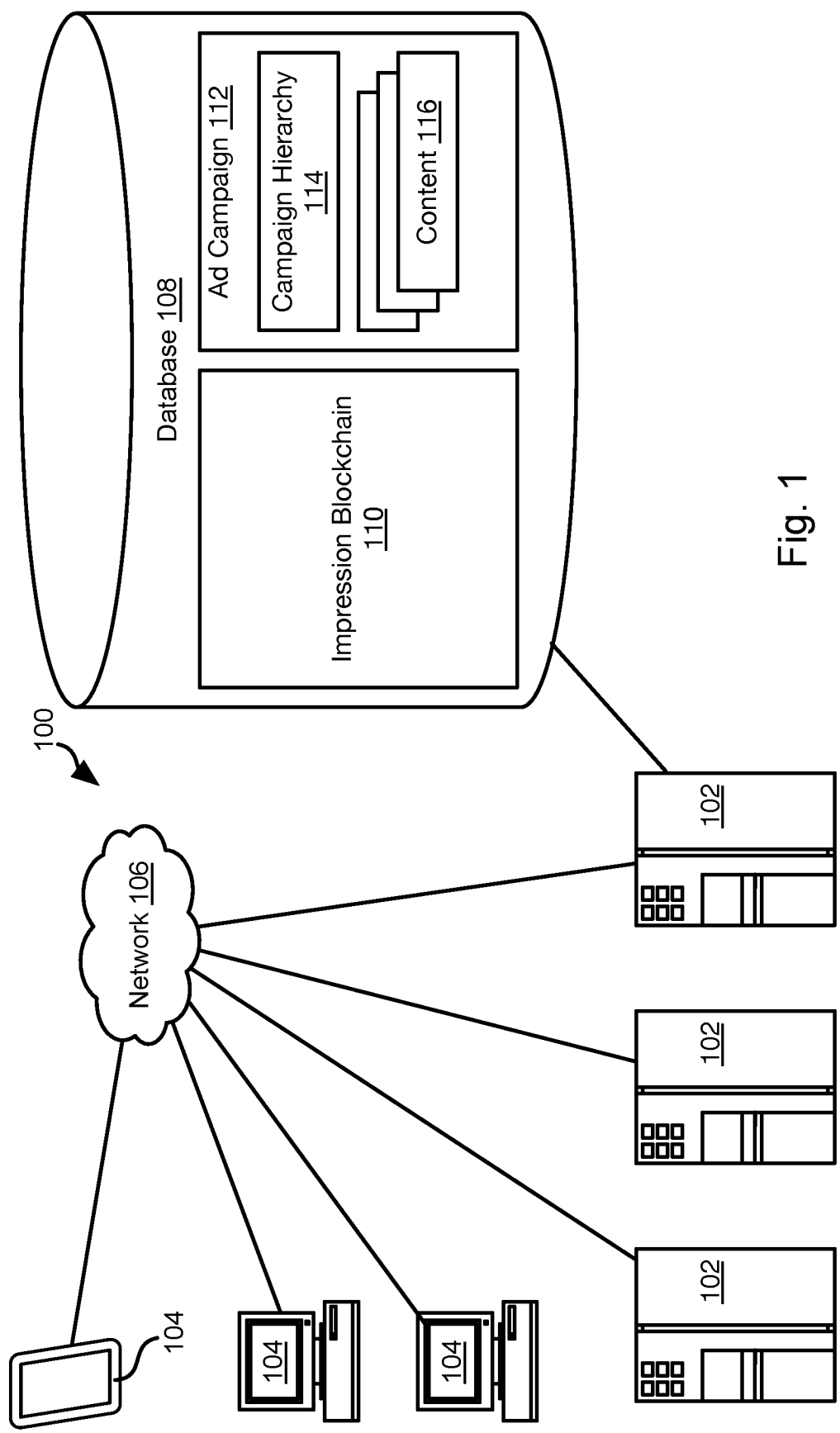
FIG. 1 is a schematic block diagram of a network environment for performing methods in accordance with an embodiment of the present invention.

Referring to FIG. 1, the methods disclosed herein may be implemented in a network environment 100 including some or all of the illustrated components. Server systems 102 may be operated by merchants that perform marketing activities or entities that perform exclusively marketing activities. The server systems 102 may operate cooperatively to maintain a blockchain recording advertising impressions. In particular, each server system 102 may one or both of maintain a copy of the blockchain and add blocks to the blockchain. In particular, the server systems 102 may implement some or all of the methods described below.

The server systems 102 may also operate to provide advertising content to consumers by way of consumer computing devices 104. The consumer computing devices 104 may be embodied as laptop or desktop computers, smart phones, tablet computers, wearable computing devices, smart televisions, or any other computing device. In other embodiments, other computer systems operate to provide advertising content and the server systems 102 operate exclusively to maintain the blockchain of advertising impressions. Advertising content may be provided by the server systems 102 directly to the consumer computing devices 104. In other embodiment, advertising content is provided by way of a third party platform, such as a third party website, third party marketplace (e.g., AMAZON Marketplace), social media platform (FACEBOOK, TWITTER, INSTAGRAM, SNAPCHAT, LINKEDIN, etc.). For example, the third party platform may provide an interface, e.g. website, social media feed, etc.) loaded with advertising content provided by the server system 102. This interface may then be accessed by a browser executing on the consumer computing device 104. In other implementations, a website from a third party is loaded by the browser on the consumer computing device 104 and includes executable code or a URL referencing the advertising content hosted by the server system 102. The browser may then execute the code or request content for the URL, which results in the browser retrieving the advertising content from the server system 102 and rendering it in the interface from the third party.

The server systems 102, consumer computing devices 104, and any third-party servers may communicate by means of a network 106, which may include the Internet, a local area network (LAN), wide area network (WAN), or any other wired or wireless network.

Each server 102 may maintain a database 108 including its copy of the impression blockchain 110. Due to delays in propagating new blocks in the blockchain 110 to all of the server systems 102, the copies of the impression blockchain 110 in the databases 108 of the various server systems 102 may be non-identical. In particular, the latest blocks in the blockchain 110 may not be stored in all of the copies of the blockchain 110, with the number of blocks absent in the least-up-to-date copy being dependent on a time delay in propagating blocks between server systems 102.

Where the server system 102 functions as a provider of advertising content, the database 108 may further store data defining an advertising campaign 112. The advertising campaign 112 may include a unique identifier that may be associated with content and advertising impressions according to the campaign 112.

The advertising campaign 112 may define a campaign hierarchy 114. The campaign hierarchy 114 divides a potential audience for the advertising campaign 112 based on geographic location, gender, other demographic attributes, interests, or any other data defining a consumer.

For example, a campaign hierarchy 114 may divide consumers by country, within a country by state or province, within a state or province by city or metropolitan region, etc. Within a specific city or metropolitan region, consumers may be divided by gender, income bracket, or any other attribute. Of course, the divisions in the hierarchy may be performed in any order. For example, at the top level of the hierarchy may be a division based on a demographic attribute, such as gender, with lower levels including other demographic attributes and/or geographic divisions. In some embodiments, the campaign hierarchy 114 may define sets of attributes (geographic, demographic, interest, or other attributes) such that consumers having the attributes of a set are grouped together for analysis purposes and/or for purposes of selecting advertising content.

The advertising campaign 112 may include advertising content 116. The content 116 may include one or more still images, animated images, videos, passages of text, audio recordings, or any other type of media content. For example, an item of content 116 may correspond to a portion of the campaign hierarchy 114. For example, an item of content 116 may correspond to the following path (e.g., set of attributes) in the hierarchy 114: US→California→Bay Area→Male→$100,000 to $200,000 income→Fitness Enthusiast. One or more items 116 of content for this path may be selected to suit the interests of such consumers and may include products, pricing, images, video, text, selected based on human judgment or automated analysis to be of interest to such a consumer. Items of content 116 may be selected for groups of consumer corresponding to any number of paths through the hierarchy 114. Multiple groups of consumers corresponding to different paths in the hierarchy 114 may receive the same items of content. In some instances, the content 116 may be the same for the entire hierarchy 114. As described below, the hierarchy 114 may be used for analysis of the reach of an advertising campaign and to determine the response of particular groups of consumer to the advertising campaign. Accordingly, using separate content 116 for different groups of consumers is not required in order to benefit from the use of a campaign hierarchy 114.

Figure 2:
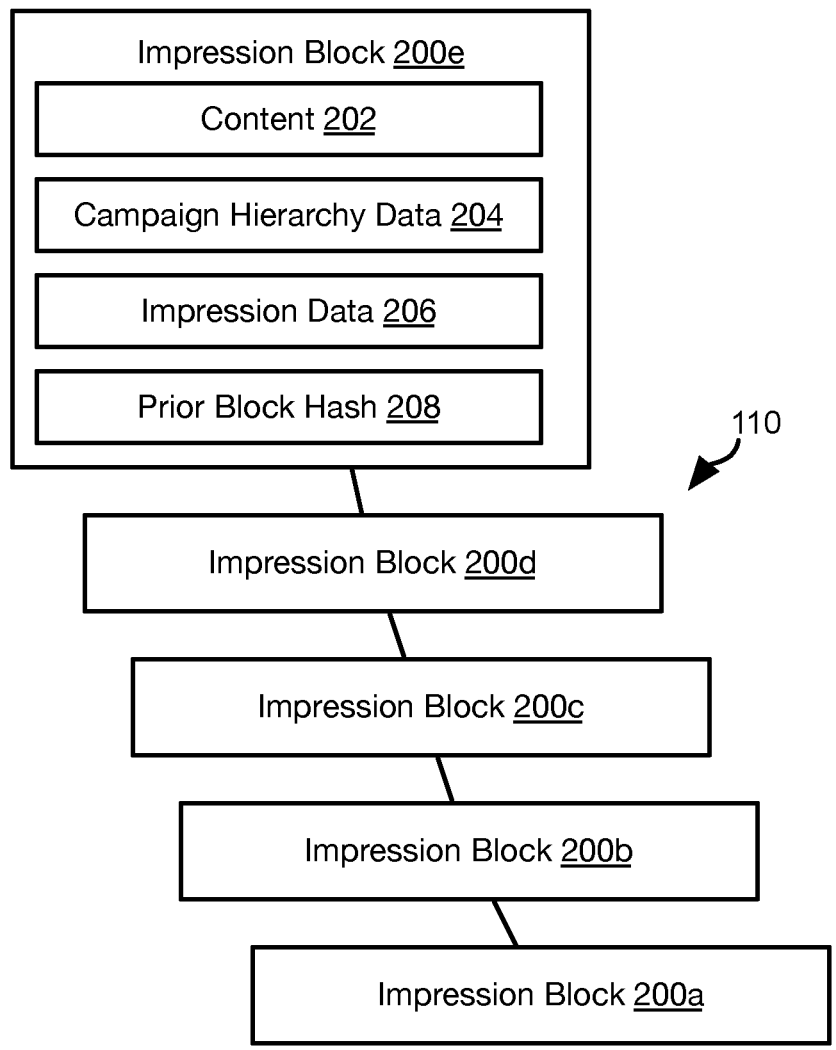
FIG. 2 is a diagram showing a blockchain for advertising impressions in accordance with an embodiment of the present invention.

Referring to FIG. 2, the impression blockchain 110 may be include any number of blocks 200a-200e. Each block 200a-200e may include a record of a single advertising impression or multiple advertising impressions. The data describing an advertising impression in a block 200a-200e may include the content 202 provided in the advertising impression or a reference to it (e.g., a URL). The data describing the advertising impression may further include campaign hierarchy data 204 that includes an identifier of the advertising campaign 112 to which the impression belongs. The campaign hierarchy data may further include a path in the advertising hierarchy (e.g., set of attributes) matching the consumer targeted by the advertising impression ("the target consumer"). For example, if data collected by an advertiser indicates that the target consumer corresponds to path US→California→Bay Area→Male→$100,000 to $200,000 income→Fitness Enthusiast in the campaign hierarchy 114, some or all of this data may be stored in the block 200a-200e as the hierarchy data 204. For example, the set of values including: male, Bay Area, income $100,000-200,000, fitness enthusiast may be sufficient to define the target consumer's location in the campaign hierarchy 114.

The block 200a-200e may further store impression data 206 describing one or more aspects of the advertising impression such as: the website or other platform (e.g., social media site) the target consumer was viewing when the content 202 was presented, whether the target consumer clicked on the content 202, how long the content was viewable by the consumer, the time and date when the content 202 was viewed, the location of the device 104 on which the content 202 was viewed, or any other data known regarding the context in which the content 202 was presented to the target consumer.

Each block 200e-200b, other than a first block 200a, may further include a hash 208 of a prior block in the blockchain 110, e.g. elements 202-208 of the prior block in the block chain 110. In this manner, the hash 208 of each block 200e-200b is dependent on the hash of a preceding block 200e-200a. The hash 208 is calculated according to the content of a block 200a-200e such that small variations in the content (e.g., items 2020-208) of the block 200a-200e will result in large changes in the hash value 208. Any attempt to modify a past block 200e-200a in the blockchain 110 will therefore result in its hash not matching the hash 208 stored a following block. This therefore reduces the possibility of deceptive modification of the blocks 200a-200e blockchain 110 once a block 200a-200e has been added to it.

The manner in which the hash is calculated and the blockchain 110 is updated with new blocks may be performed using any approach for implementing a blockchain as known in the art.

Figure 3:
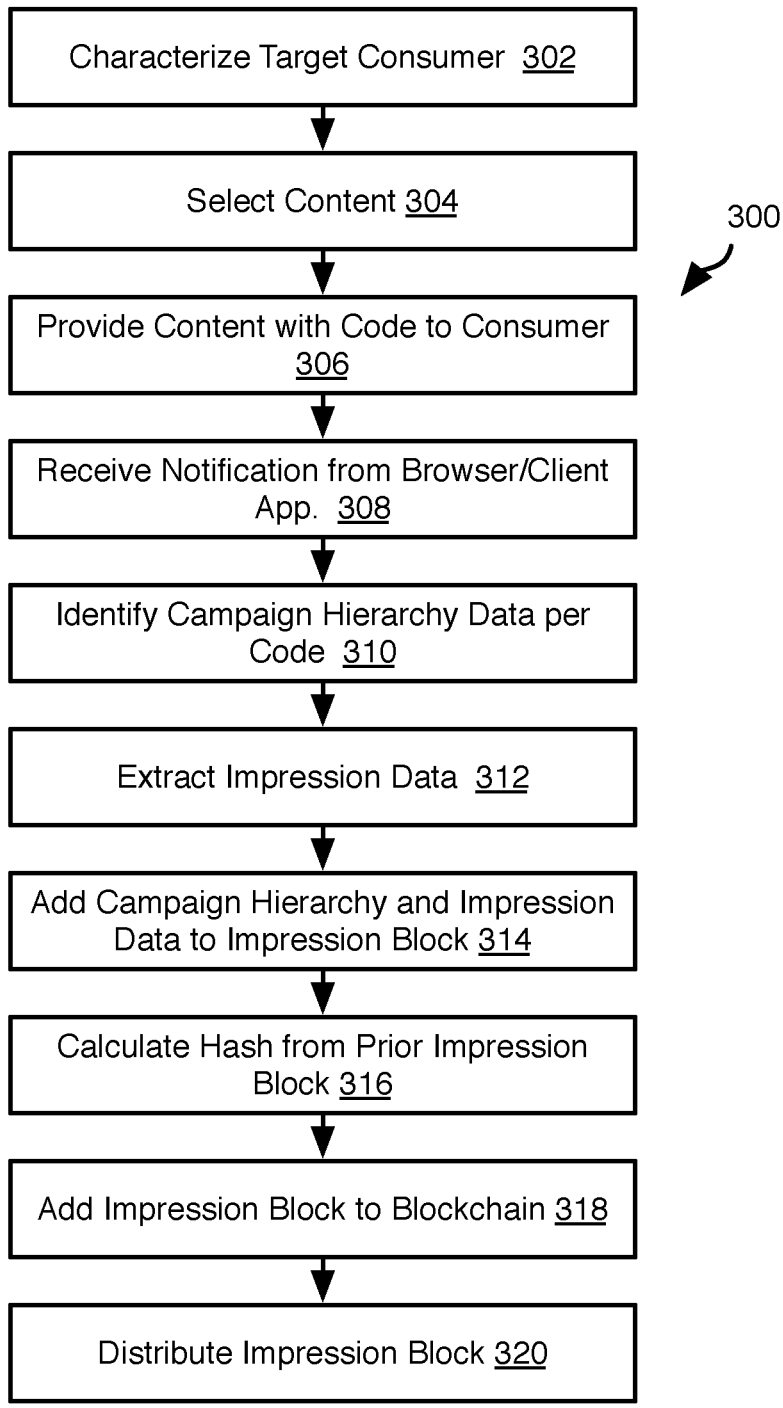
FIG. 3 is a process flow diagram of a method for adding impressions to a blockchain in accordance with an embodiment of the present invention.

FIG. 3 illustrates a method 300 for creating an impression blockchain 110. The method 300 may be executed by a server system 102. The method 300 may include characterizing 302 a target consumer. This may include collecting data directly from a user, e.g. through filling of a form. This may also include tracking browsing and shopping activities or obtaining data from a third party. Examples of approaches for tracking a user's browsing and shopping activities are disclosed in U.S. application Ser. No. 15/788,466 filed Dec. 19, 2017 and entitled Browser Fingerprinting and U.S. application Ser. No. 15/788,498 filed Dec. 19, 2017 and entitled Cross Device User Identification, which are hereby incorporated herein in their entirety.

The method 300 may further include selecting content 304 for the target consumer. As noted above, this may include selecting an item of content 116 corresponding to the path (e.g., set of attributes) of the target consumer in the campaign hierarchy 114. In particular, using the data obtained from the characterizing step 302, the path of the target consumer may be determined. Content 116 corresponding to this path may be selected 304. As noted above, the content 116 may be the same for all target consumers such that selection 304 of content simply includes selecting that content 116.

The method 300 may include providing 306 the selected content to the target consumer. This may be performed using any medium for delivering advertisements as known in the art. The selected content may be encoded to obtain encoded content, such as by embedding in it a segment of executable code (e.g., script) or other unique code either of which is uniquely associated by the server system 102 with one of (a) the specific target consumer and (b) a group of consumers corresponding to a particular path in the campaign hierarchy, e.g. a set of geographic, demographic, interest, or other attributes defining a group of target consumers in the campaign hierarchy 114. Encoding may include setting a pixel of an image or video to be equal to the unique code or adding metadata to the selected content that includes the unique code or executable code.

The encoded content may be provided 306 to the target consumer directly, such as by the target consumer browsing a website hosted by the server system 102. The server system 102 may then provide the encoded content as an advertisement in a website returned to the consumer computing device 104 operated by the target consumer.

The system and methods disclosed herein provide an improved approach for verifying whether advertising impressions occurred. Accordingly, this approach is particularly useful where the encoded content is provided through a third party, such as third party website, social media platform, messaging platform, third party marketplace, or other third party platform for delivering content. This third party platform may then provide the encoded content to the consumer computing device 104 operated by the target consumer, such as embedded as an advertisement embedded in content (website, social media feed, message feed, etc.) provided by the third party platform. In still other embodiments, content from the third party platform may include a URL or other executable code that invokes retrieval of the encoded content from the server system 102.

Upon receiving the encoded content, a client application (e.g., browser) on the consumer computing device 104 operated by the target consumer, renders the encoded content on a display of the computing device 104. This may include executing the executable code embedded in the encoded content or finding the unique code. In either case, the browser may be programmed to transmit a notification in response. For example, the executable code may invoke the browser to transmit the notification or the browser may be programmed to decode the unique code and use information obtained therefrom to send a notification to the server system 102 that created the unique code.

In either case, the server system 102 receives 308 the notification. Note that in some implementations, the generating and serving of advertising content is performed by a different computing system than that which maintains the blockchain 110. Accordingly, references to "the server system 102" with respect to step 308 and subsequent steps may refer to a different server system than that which is used for steps 302 through 306.

The server system 102 may then identify 310 the campaign hierarchy data 204 corresponding to the notification. For example, the notification may include the unique code. At the time of generation of the unique code at step 306, a mapping may be created by the server system 102 that associates the unique code with one or both of the identifier of the advertising campaign 112 and the place of the target in the campaign hierarchy according to the characterizing of step 302. Accordingly, step 310 may include obtaining the data from the characterizing step 302 mapped to the unique code. In a similar manner, executable code embedded in the selected content may transmit a notification including a unique code mapped to some or all of the data from the characterizing step 302. Alternatively, an identifier of the advertising campaign 112 and/or the set of attributes defining the target consumer's place in the campaign hierarchy may be included with the executable code in the encoded content. Accordingly, the executable code may transmit this set of attributes, which is then received at step 308 and extracted from the notification at step 310.

The method 300 may further include extracting 312 impression data 206. As noted above, impression data 206 may include: the website or other platform (e.g., social media site) the target consumer was viewing when the selected content was presented, whether the target consumer clicked on the selected content, how long the selected content was viewable by the consumer, the time and data when the selected content was viewed, the location of the device 104 on which the selected content was viewed, or any other data known regarding the context in which the content 202 was presented to the target consumer. The notification of step 308 may include some or all of this information or this information may be provided in a separate message. For example, an agent executing in the browser may collect and return some or all of this information. For example, the executable code of the encoded content may be programmed to collect and return some or all of this information to the server system 102. This data may be collected by the third party platform that provided the encoded content and provided to the server system 102.

The method 300 may include creating 314 an impression block 200a-200e. For example, a block may be created that includes some or all of: a reference to the selected content, the campaign hierarchy data 204, and the impression data 206. A hash of a prior block in the blockchain 110 may also be calculated 316 and the impression block, including the hash from step 316, may be added 318 to the impression blockchain 110. The impression block may also be distributed 320 to one or more other server systems 102 that maintain copies of the blockchain 110.

In some implementations of a blockchain 110, addition of blocks to the blockchain 110 is performed using a "mining" approach whereby server systems 102 storing copies of the blockchain must solve a mathematical problem, such as coming up with the hash for the new block before being able to add a block to the blockchain. Accordingly, steps 316-320 may be performed by the same server system 102 as performed steps 308-314 or a different server system performing mining. The approach of creating blocks, adding them to the blockchain, and distributing new blocks to other hosts of the blockchain may be performed using any approach known in the art for implementing a blockchain.

As noted above, multiple impressions may be added to the same block 200a-200e of the blockchain 110. Accordingly, the data for multiple impressions may be aggregated for a block prior to performing steps 316-320. An impression in this case may be therefore include some or all of the items of data 202-206 for an individual advertising impression.

Figure 4:
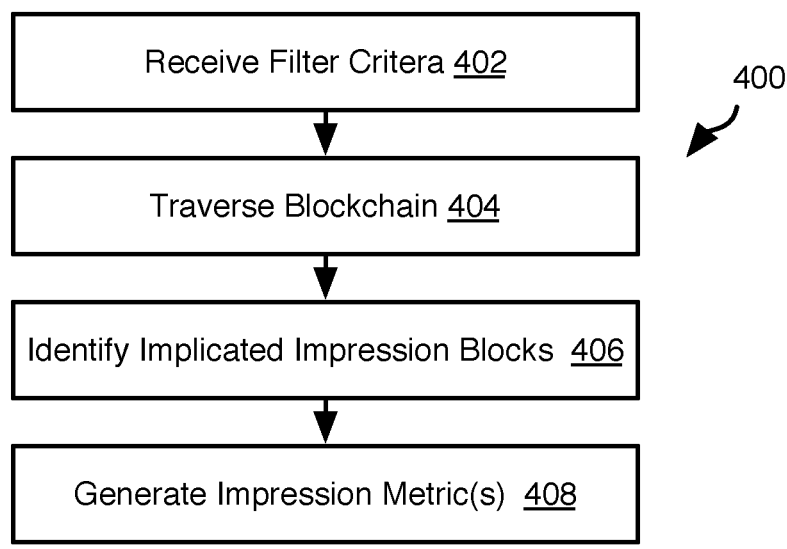
FIG. 4 is a process flow diagram of a method for using impression data from a blockchain in accordance with an embodiment of the present invention.

FIG. 4 illustrates an example method 400 that may be used to evaluate the reach of an advertising campaign using the blockchain 110 as defined and created using the approach described above. The method 400 may be executed by a server system 102 performing all or part of the method 300 or some other computing system that has access to the impression blockchain 110.

The method 400 may include receiving 402 filter criteria. The filter criteria may specify data required to be found in an advertising impression (i.e., a block 200a-200e or individual advertising impression in a multi-impression block 200a-200e). The specific data may be in any of the fields 202-206 of the impression. For example, the identifiers for one or more advertising campaigns 112 may be received as filter criteria. Impressions for a particular group of target consumers may be of interest. Accordingly, filter criteria may include the attributes (demographic, geographic, interest, etc.) that define that group or some other identifier mapped to that group.

The method 400 may include traversing 404 the blockchain 110 and identifying 406 those blocks 200a-200e that satisfy the filter criteria, e.g., wherein values in fields 202-206 match the filter criteria. For example, where an advertising campaign identifier and a set of attributes are specified, those blocks 200e including campaign hierarchy data 204 matching these filter criteria may be identified 406 as relevant to the filter criteria.

The method 400 may further include generating 408 one or more metrics based on the identified blocks. The result of step 406 is a knowledge of advertising impressions for a group of target consumers. Any metric for characterizing this collection of impressions may be calculated at step 408. For example, the total number of impressions, a number of impressions per third party platform, a distribution of impressions over time (e.g., per week over a multi-week interval, or per day over a multi-day interval), or the like. The impressions identified according to step 406 may be related to other data, such as sales data in order to determine the effectiveness of the advertisement. For example, sales to consumers having attributes specified in the filter criteria of step 402 may be related to the impressions identified according to step 406. Any statistical technique for determining the causal relationship between two variables may be used.

Figure 5:
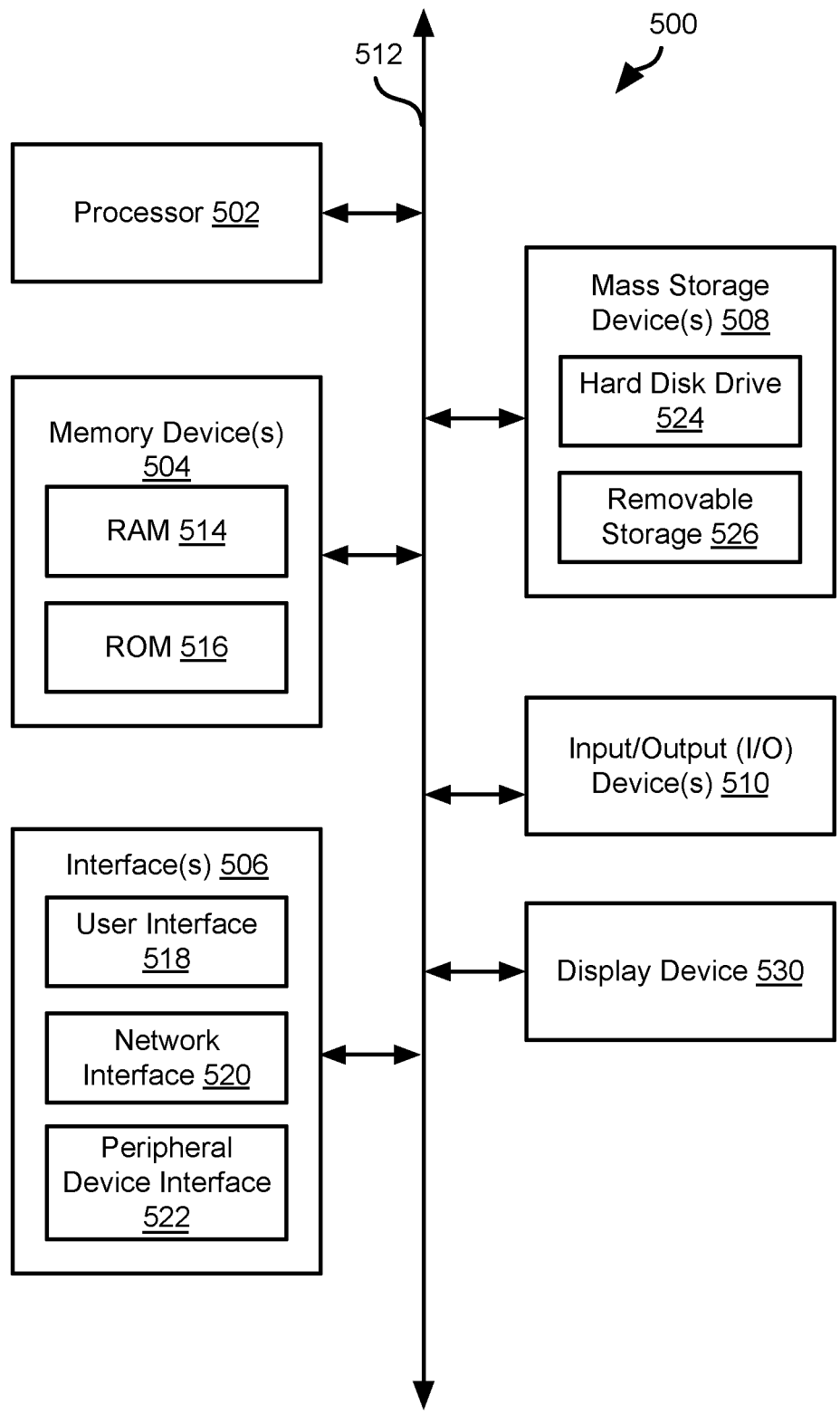
FIG. 5 is a schematic block diagram of a computer system suitable for implementing methods in accordance with embodiments of the present invention.

FIG. 5 is a block diagram illustrating an example computing device 500 which can be used to implement the system and methods disclosed herein. The server systems 102 and consumer computing devices 104 may also have some or all of the attributes of the computing device 500. In some embodiments, a cluster of computing devices interconnected by a network may be used to implement any one or more components of the invention.

Computing device 500 may be used to perform various procedures, such as those discussed herein. Computing device 500 can function as a server, a client, or any other computing entity. Computing device can perform various monitoring functions as discussed herein, and can execute one or more application programs, such as the application programs described herein. Computing device 500 can be any of a wide variety of computing devices, such as a desktop computer, a notebook computer, a server computer, a handheld computer, tablet computer and the like.

Computing device 500 includes one or more processor(s) 502, one or more memory device(s) 504, one or more interface(s) 506, one or more mass storage device(s) 508, one or more Input/Output (I/O) device(s) 510, and a display device 530 all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM) 514) and/or nonvolatile memory (e.g., read-only memory (ROM) 516). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. As shown in FIG. 5, a particular mass storage device is a hard disk drive 524. Various drives may also be included in mass storage device(s) 508 to enable reading from and/or writing to the various computer readable media. Mass storage device(s) 508 include removable media 526 and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like.

Display device 530 includes any type of device capable of displaying information to one or more users of computing device 500. Examples of display device 530 include a monitor, display terminal, video projection device, and the like.

Interface(s) 506 include various interfaces that allow computing device 500 to interact with other systems, devices, or computing environments. Example interface(s) 506 include any number of different network interfaces 520, such as interfaces to local area networks (LANs), wide area networks (WANs), wireless networks, and the Internet. Other interface(s) include user interface 518 and peripheral device interface 522. The interface(s) 506 may also include one or more user interface elements 518. The interface(s) 506 may also include one or more peripheral interfaces such as interfaces for printers, pointing devices (mice, track pad, etc.), keyboards, and the like.

Bus 512 allows processor(s) 502, memory device(s) 504, interface(s) 506, mass storage device(s) 508, and I/O device(s) 510 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s). At least some embodiments of the disclosure have been directed to computer program products comprising such logic (e.g., in the form of software) stored on any computer useable medium. Such software, when executed in one or more data processing devices, causes a device to operate as described herein.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:

receiving, by a computer system, a campaign hierarchy with a plurality of levels, each level of the plurality of levels defining division of consumers for an attribute, the attribute for each level of the plurality of levels being one of a geographic location and a demographic attribute and each path through the campaign hierarchy having advertising content associated therewith;

generating a plurality of advertising impressions by, for each advertising impression:

obtaining attributes of a consumer of a plurality of consumers;

obtaining a consumer path through the campaign hierarchy corresponding to the attributes of the consumer and select electronic advertising content for the consumer according to the consumer path generating the each advertising impression including the electronic advertising content for the consumer transmitting the electronic advertising content to a browser operated by the consumer, the electronic advertising content including an executable code;

receiving, from the executable code executing within the browser, a notification that the electronic advertising content has been displayed by the browser; and in response to receiving the notification from the executable code that the electronic advertising content has been displayed by the browser, creating a block in a blockchain, the block including data describing the each advertising impression and a hash of a preceding block in the blockchain, the data describing the each advertising impression including the consumer path used to select the electronic advertising content for the each advertising impression.

2. The method of claim 1, wherein the data describing the each advertising impression includes data describing an advertising campaign including content delivered for the each advertising impression.

3. The method of claim 2, wherein the data describing the advertising campaign includes one or more attributes of a consumer that received the each advertising impression.

4. The method of claim 3, wherein the one or more attributes include at least one of a geographic location and a demographic attribute.

5. The method of claim 1, wherein the each advertising impression includes receipt of electronic advertising content by a consumer.

6. The method of claim 1, wherein the executable code is embedded in a digital image.

7. The method of claim 1, further comprising, for each advertising impression of the plurality of advertising impression, distributing the block to a plurality of second computing devices.

8. The method of claim 1, further comprising:

traversing the blockchain to collect data regarding the plurality of advertising impressions; and presenting a graphical representation of the data regarding the plurality of advertising impressions.

9. The method of claim 8, wherein traversing the blockchain to collect data regarding the plurality of advertising impressions comprises identifying blocks of the block chain storing advertising impressions satisfying one or more filter criteria.

10. A system comprising one or more processing devices and one or more memory devices operably coupled to the one or more processing devices, the one or more memory devices storing executable code effective to cause the one or more processing devices to:

receiving a campaign hierarchy with a plurality of levels, each level of the plurality of levels defining division of consumers for an attribute, the attribute for each level of the plurality of levels being one of a geographic location and a demographic attribute and each path through the campaign hierarchy having advertising content associated therewith;

for each consumer of a plurality of consumers, obtain attributes of the each consumer, obtain a consumer path through the campaign hierarchy corresponding to the attributes of the each consumer, and select advertising content for the each consumer according to the consumer path, and generate an advertising impression of a plurality of advertising impressions including the advertising content for the each consumer, the advertising content including an executable code; and for each advertising impression of the plurality of advertising impressions: (a) receive a notification of the each advertising impression from the executable code executing within a browser of a consumer of the plurality of consumers; and (b) create a block in a blockchain, the block including data describing the each advertising impression and a hash of a preceding block in the block, the data describing the each advertising impression including the consumer path used to select the advertising content for the each advertising impression.

11. The system of claim 10, wherein the data describing the each advertising impression includes the advertising content for the each advertising impression.

12. The system of claim 10, wherein the each advertising impression includes receipt of electronic advertising content by a consumer.

13. The system of claim 12, wherein the executable code is further effective to cause the one or more processing devices to:

transmit the electronic advertising content to a browser operated by the consumer, the electronic advertising content including an executable script; and receive, from the executable script executing within the browser, the notification of the each advertising impression.

14. The system of claim 13, wherein the executable code is embedded in a digital image.

15. The system of claim 10, wherein the executable code is further effective to cause the one or more processing devices to, for each advertising impression of the plurality of advertising impression, distribute the block to a plurality of second computing devices.

16. The system of claim 10, wherein the executable code is further effective to cause the one or more processing devices to:

traverse the blockchain to collect data regarding the plurality of advertising impressions; and present a graphical representation of the data regarding the plurality of advertising impressions.

17. The system of claim 16, wherein the executable code is further effective to cause the one or more processing devices to:

traverse the blockchain to collect data regarding the plurality of advertising impressions by identifying blocks of the block chain storing advertising impressions satisfying one or more filter criteria.

* * * * *